US006186423B1

United States Patent
Chapman

(10) Patent No.: US 6,186,423 B1
(45) Date of Patent: Feb. 13, 2001

(54) IRRIGATION SYSTEM

(76) Inventor: John A. Chapman, 1306 N. Birch St, Wahoo, NE (US) 68066

(*) Notice: Under 35 U.S.C. 154(b), the term of this patent shall be extended for 0 days.

(21) Appl. No.: 09/419,589

(22) Filed: Oct. 18, 1999

(51) Int. Cl.[7] .............................. B05B 3/00; A01G 25/06; E02B 11/00
(52) U.S. Cl. .............................. 239/729; 239/201; 405/37
(58) Field of Search .................................. 239/729, 730, 239/99, 200, 201, 207, 542; 405/43, 45, 36, 37

(56) References Cited

U.S. PATENT DOCUMENTS

| 585,856 | * | 7/1897 | Swanson | 405/37 |
|---|---|---|---|---|
| 3,080,881 | | 3/1963 | Stilwell et al. | 137/119 |
| 3,518,831 | | 7/1970 | Tibbals, Jr. et al. | 61/13 |
| 3,693,888 | | 9/1972 | Rondas et al. | 239/535 |
| 3,777,980 | | 12/1973 | Allport | 239/272 |
| 3,797,741 | | 3/1974 | Spencer | 239/11 |
| 3,899,136 | | 8/1975 | Harmony | 239/534 |
| 3,926,375 | | 12/1975 | Reeder et al. | 239/542 |
| 4,100,940 | | 7/1978 | Spears | 137/877 |
| 4,161,292 | * | 7/1979 | Holloway et al. | 239/729 |
| 4,176,791 | | 12/1979 | Cattaneo et al. | 239/76 |
| 4,288,035 | | 9/1981 | Rosenberg | 239/271 |
| 4,431,338 | * | 2/1984 | Hornabrook | 405/37 |
| 4,685,827 | | 8/1987 | Sibbel | 405/37 |
| 5,295,506 | | 3/1994 | Smith | 137/271 |
| 5,314,116 | * | 5/1994 | Krauth et al. | 239/99 |
| 5,507,436 | * | 4/1996 | Ruttenberg | 239/524 |
| 5,531,381 | | 7/1996 | Ruttenberg | 239/99 |
| 5,615,838 | | 4/1997 | Eckstein et al. | 239/533.1 |
| 5,628,462 | | 5/1997 | Miller | 239/542 |
| 5,676,897 | | 10/1997 | Dermitzakis | 264/167 |
| 5,820,028 | | 10/1998 | Dinur | 239/542 |

OTHER PUBLICATIONS

Intertec Corporation brochure entitled "Pulse Irrigation", undated, published in USA.
Drip In Irrigation Company flyer entitled "Introducing the Drip–In 0.62" (18mm) Emitter", undated, printed in USA.

* cited by examiner

*Primary Examiner*—Patrick Brinson
*Assistant Examiner*—Davis Hwu
(74) *Attorney, Agent, or Firm*—Zarley, McKee, Thomte, Voorhees & Sease; Dennis L. Thomte

(57) ABSTRACT

An irrigation system for a field, wherein a circular central portion of the field is irrigated by a center pivot irrigation machine, comprising a buried primary water line which extends from a source of water to the vicinity of the field area to be irrigated. At least one, and normally several, header water lines are in fluid communication with the primary water line and extend therefrom with a three-way pulse valve being imposed in each of the header water lines. A plurality of distribution water lines are in fluid communication with each of the header water lines and extend therefrom downstream of the pulse valve. A plurality of spaced-apart, in-line pulse emitter valves are imposed in each of the water distribution lines and have a water discharge orifice associated therewith for discharging water outwardly from the water distribution line to the area immediately adjacent thereto.

6 Claims, 7 Drawing Sheets

IRRIGATION SYSTEM

BACKGROUND OF THE INVENTION

1. Field of the Invention

This invention relates to an irrigation system for a field area and more particularly to an irrigation system for watering the corners of a field which is irrigated by a center pivot irrigation machine or system. More particularly, the irrigation system of this invention employs a plurality of spaced-apart, in-line emitters imposed in distribution water lines which are buried beneath the surface of the field in the corners of the field.

2. Description of the Related Art

There are an estimated 62.4 million acres of land irrigated in the United States. Of this area, about 30 million acres are irrigated with sprinkler irrigation. There are also 4.3 million acres irrigated by low flow techniques. Of the 30 million acres irrigated by sprinklers, some estimates show about 20 million acres are irrigated by center pivot irrigation machines or systems. Most center pivot fields do not have a corner system. If all of the center pivot irrigated land were in square quarter sections, there would be approximately 4.4 to 5.4 million acres in the corners. Most of these acres lay barren, or are farmed in a dry land manner; therefore, there is a need to irrigate these corners.

The center pivot industry has elected to solve the corner irrigation problem with a highly complex, short-life, and expensive corner attachment. While corner systems have been effective in some locations, and on some crops, corner systems have not been widely adopted in the central part of the United States. Nebraska, with its 8 million acres of irrigated land; Texas, with its 6.5 million of irrigated land; and California, with its 9.6 million acres of irrigated land, do not employ an abundance of corner systems which may be dependent upon the unreliability of the systems and the lack of uniformity of water pattern. Further problems are the fact that the corner systems get stuck and create wheel tracks in the corners of the fields. A further possible disadvantage of the corner irrigation systems is that the installed cost of a corner system (to the grower) is approximately $29,000, or a per acre cost of about $1,100 for each irrigated acre under the hardware. The cost of corner systems compares approximately to the cost of low flow technology systems.

Certain drip tape manufacturers are promoting use of varied drip tape in the corners of the field. Buried drip tape in the corners of the field have been researched and rejected (in most cases) because of the problems that the tape industry has with buried tape. The tape may plug and the grower may not realize the same, thus leading to reduced yields. The buried drip tape may need replacing in a short time if it cannot be unplugged. Some persons are of the belief that buried drip tape will not work on sandy fields. It is believed by some that the inability of the drip tapes to function properly is the inability of the same to adequately supply water to the areas adjacent the discharge openings and to prevent plugging or clogging of those discharge openings.

SUMMARY OF THE INVENTION

An irrigation system for a field, wherein a circular central portion of the field is irrigated by a center pivot irrigation machine, is described for irrigating the corners of the field. A buried primary water line extends from a source of water to the vicinity of the field area to be irrigated. At least one, and normally several, header water lines are in fluid communication with the primary water line and extend therefrom with a three-way pulse valve being imposed in each of the header water lines. A plurality of distribution water lines are in fluid communication with each of the header water lines and extend therefrom downstream of the pulse valve. A plurality of spaced-apart, in-line pulse emitter valves are imposed in each of the water distribution lines and have a water discharge orifice associated therewith for discharging water outwardly from the water distribution line to the area immediately adjacent thereto. The primary water line, header water line and distribution water lines are buried below the surface of the field. The pulse valves cause the in-line pulse emitters to pulse in a manner which does not require radical, pre-filtering of debris from the water or algae control. The emitter discharges under pressure and creates a hollow cavity in the soil profile. The emitter has a very coarse filter at its exit to reduce the possibility of plugging due to the siphon effect, when a shutdown on a slope occurs. When the system is started, the system is brought to pressure and the pulse valve automatically starts pulsing. This action primes the distribution water lines and allows the same to pulse and distribute water. Since the distribution lines are at static pressure, before the pulse occurs, and the spacing of the distribution emitters is uniform, the uniformity of distribution is assured.

It is therefore a principal object of the invention to provide a method for irrigating the corners of a field.

Still another object of the invention is to provide an irrigation for a field system including spaced-apart, in-line emitters imposed in distribution water lines which are buried in the soil.

Still another object of the invention is to provide a system of the type described above including in-line pulse emitters which do not require radical pre-filtering of the irrigation water.

Still another object of the invention is to provide a system of the type described above including in-line pulse emitters which does not require that the irrigation water be subjected to algae control.

Still another object of the invention is to provide an irrigation system of the type described which uniformly waters the field area being irrigated.

Still another object of the invention is to provide a relatively inexpensive system for irrigating the corners of a field.

These and other objects will be apparent to those skilled in the art.

DESCRIPTION OF THE PREFERRED EMBODIMENT

Figure 1:
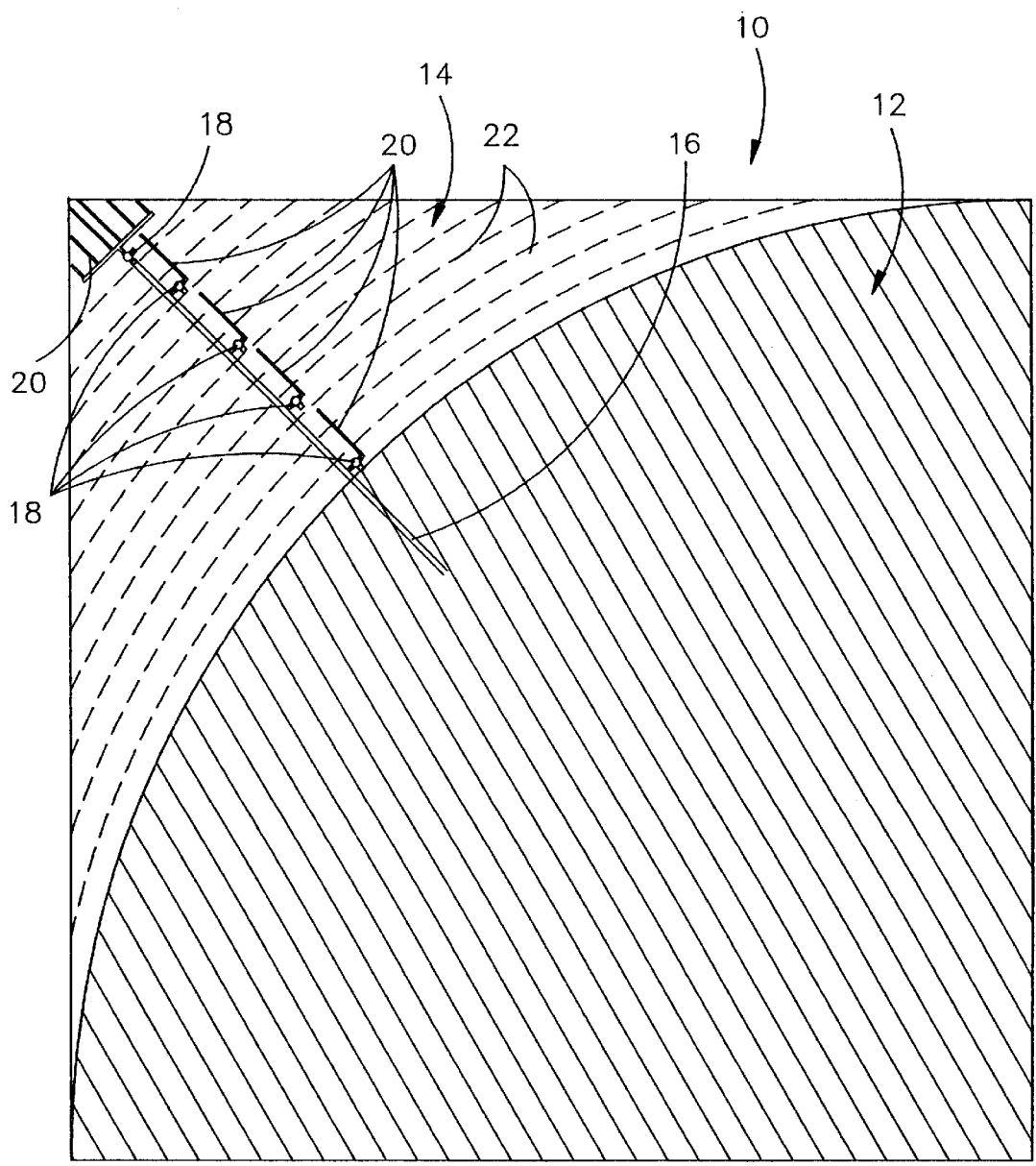
FIG. 1 is a plan view of a corner of a field which is irrigated with a center pivot irrigation system and having one embodiment of this invention utilized in the corner thereof for irrigating the same.
Figure 2:
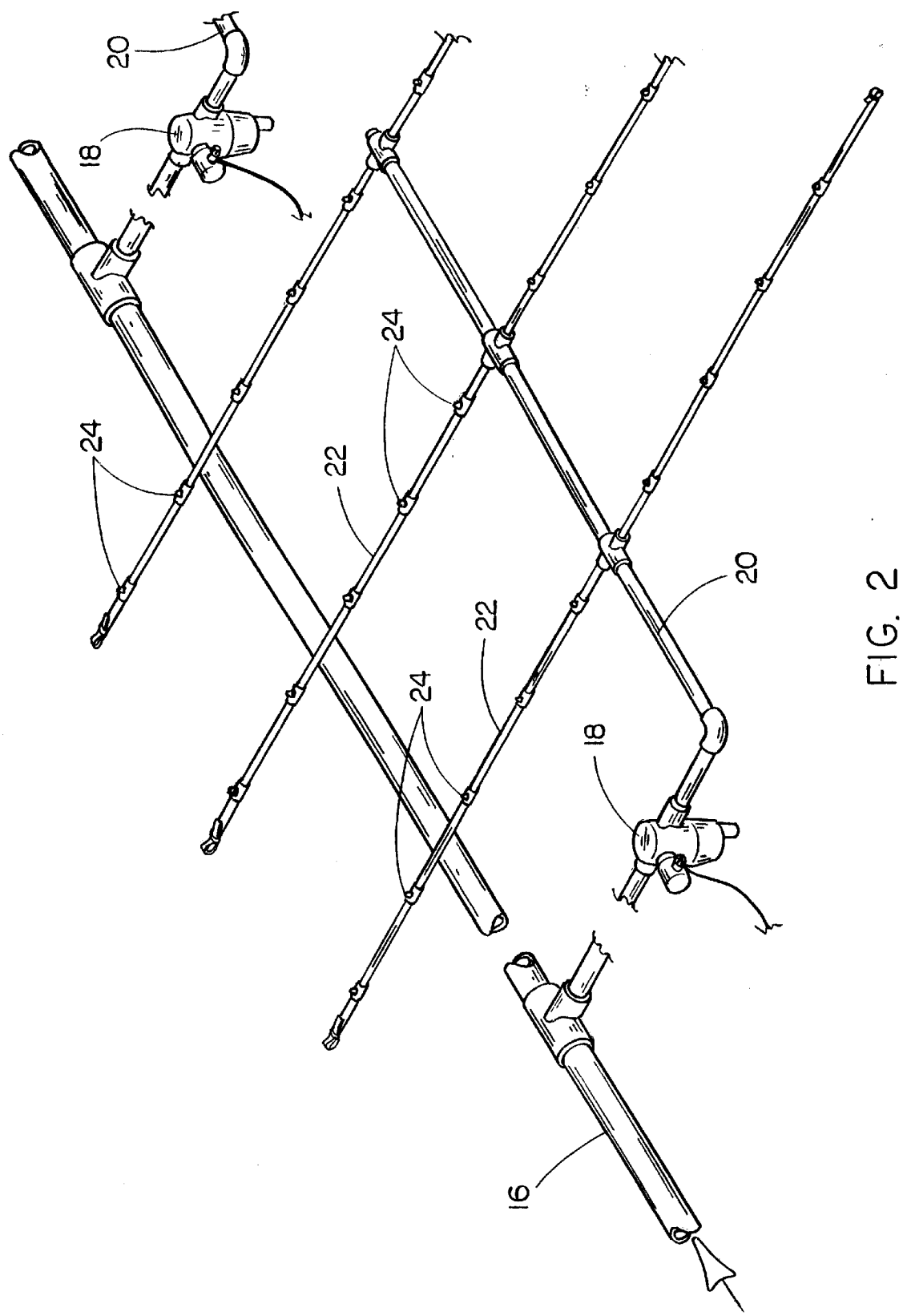
FIG. 2 is a perspective view of a primary water line, header water line and distribution water lines extending therefrom.
Figure 3:
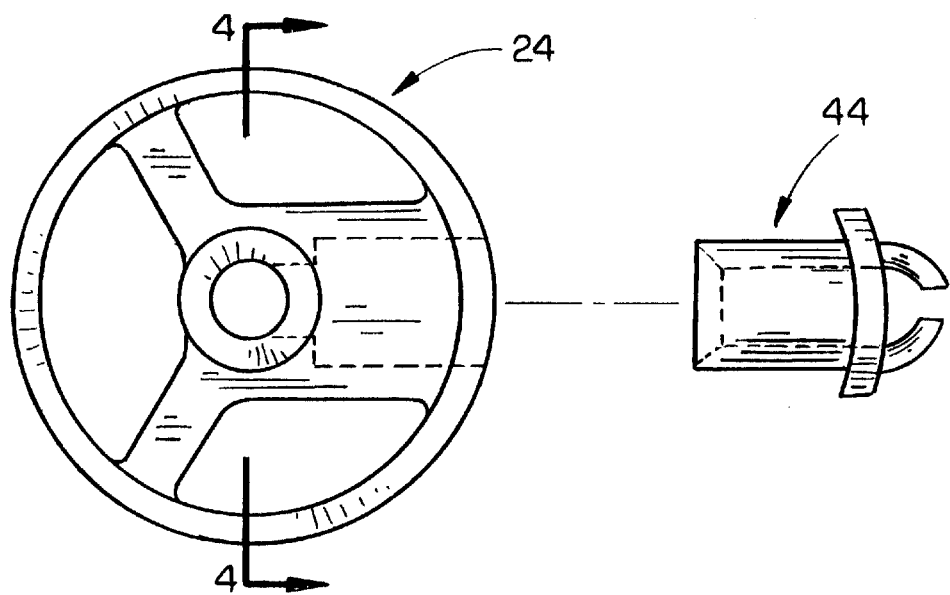
FIG. 3 is an end elevational view of the pulse emitter of this invention.
Figure 4:
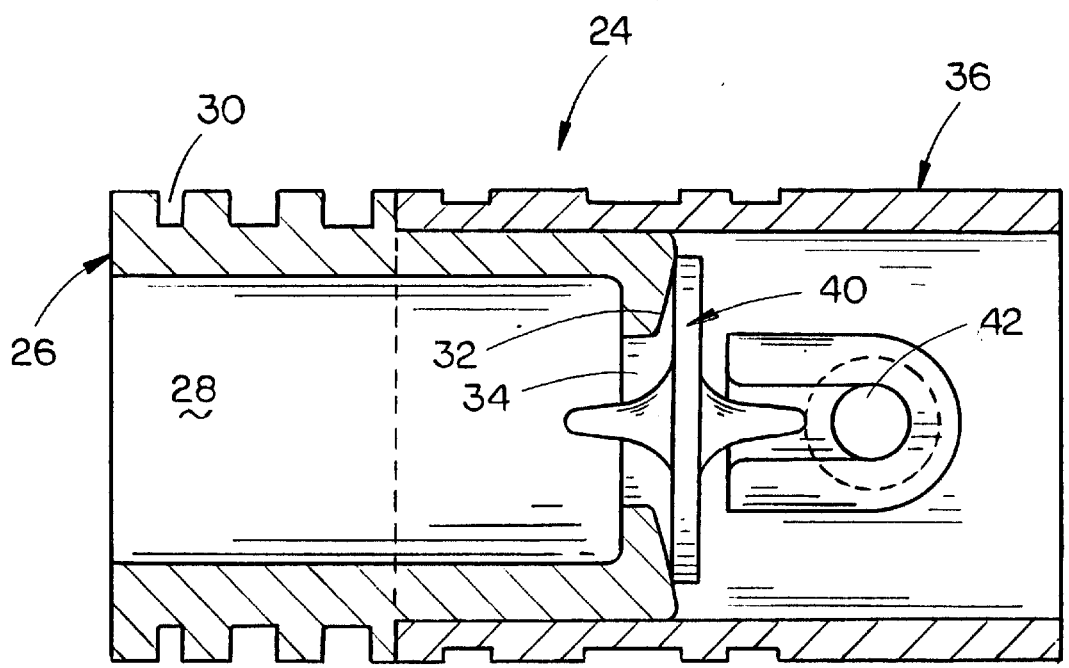
FIG. 4 is a sectional view seen on lines 4—4 of FIG. 3.
Figure 5:
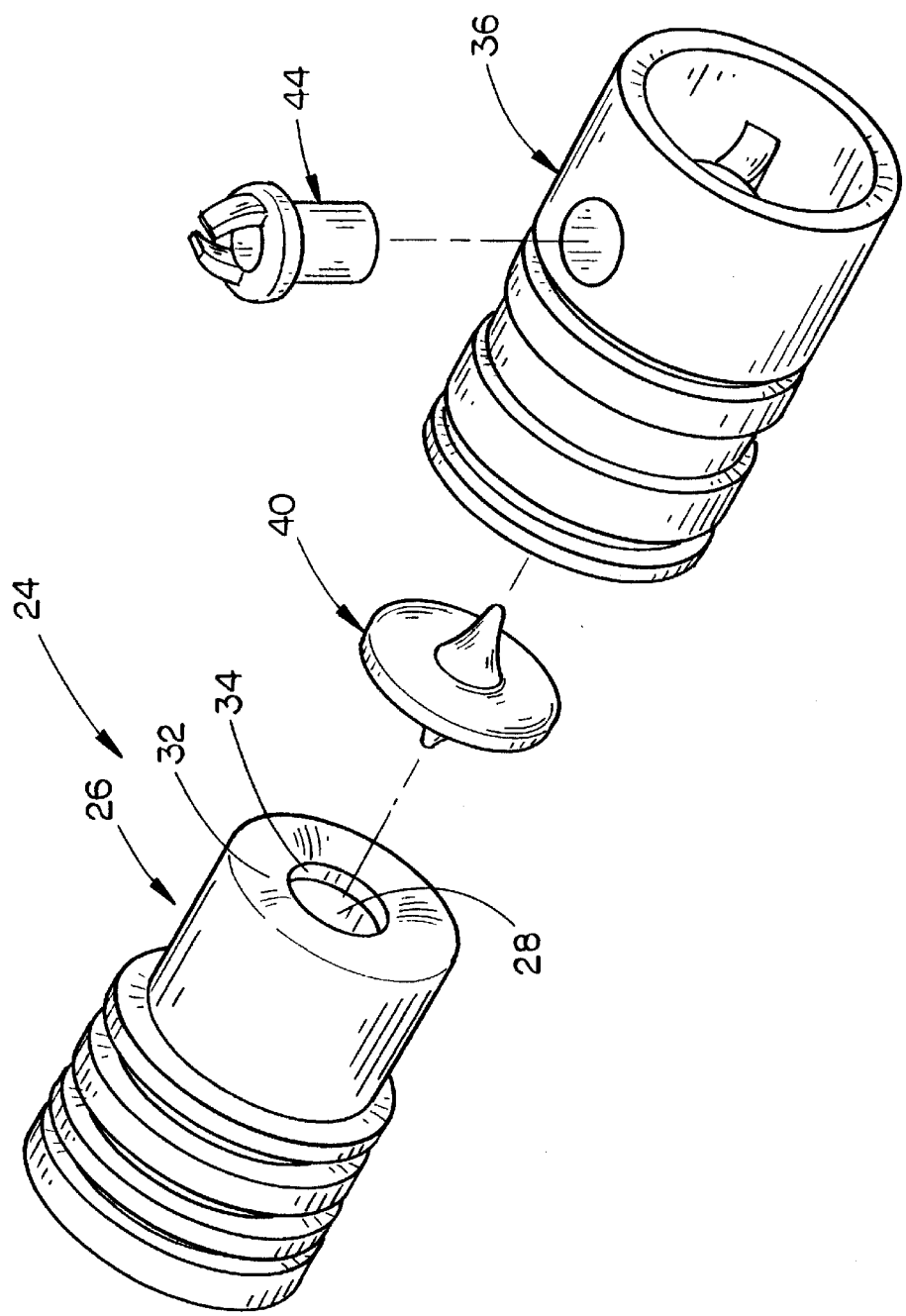
FIG. 5 is an exploded perspective view of the pulse emitter of this invention.

FIG. 1 illustrates one-quarter of a square field 10 with the numeral 12 referring to the area which is watered by way of a center pivot irrigation machine in conventional fashion. The numeral 14 refers to the corner of the field which is not normally watered or irrigated by the center pivot irrigation system.

The numeral 16 refers to a primary water line which is in communication with a source of water under pressure. If four corners of the field are to be watered, four of the primary water lines would extend from the source of water under pressure, such as a water pump, to the four corners of the field. Primary water line 16 has a plurality of header water lines 20 extending therefrom. A three-way pulse valve 18 is imposed in each of the header water lines 20. A plurality of distribution water lines 22 are in fluid communication with each of the header water lines 20 and are spaced-apart, as illustrated in FIG. 1, to water the entire corner of the field 10. A plurality of spaced-apart, in-line emitters 24 are imposed in each of the distribution water lines 22 to achieve uniform watering or irrigating of the extreme corner of the field.

A plurality of distribution water lines 22 extend substantially transversely from each of the header water lines 20, as shown in dashed lines in FIG. 1. The distribution water lines 22 extend from the header water lines 20 to the boundary of the field, as illustrated in FIG. 1. A plurality of spaced-apart, in-line emitter valves 24 are also provided in the distribution lines 22 so that the entire corner of the field will be watered or irrigated.

Figure 8:
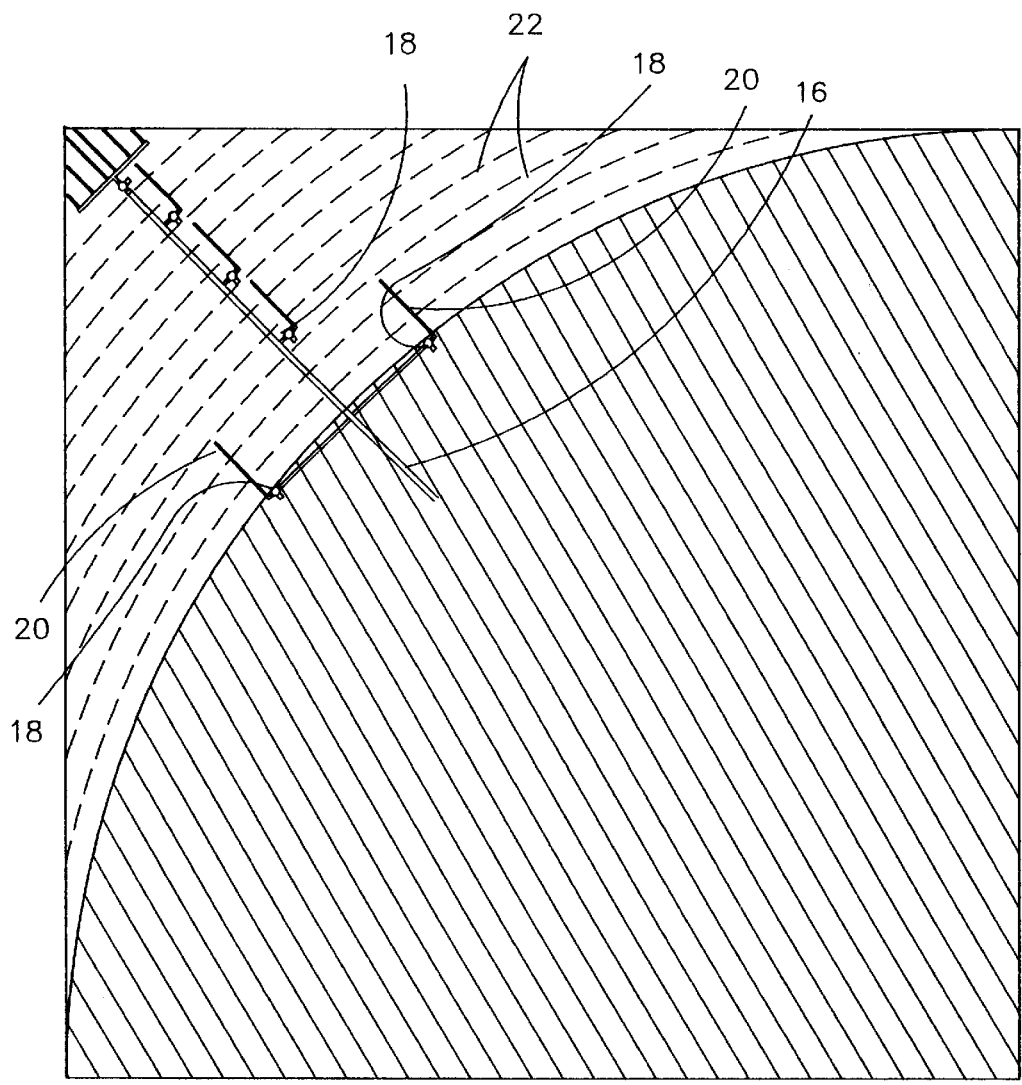
FIG. 8 is a view similar to FIG. 1 except that a modified method of irrigating the corner is illustrated.

FIG. 8 illustrates a modified form of the invention which is essentially identical to that shown in FIG. 1 except that a pair of header water lines are utilized at the inner end of the corner, since the distribution water lines extending therefrom have greater area to irrigate.

Figure 6:
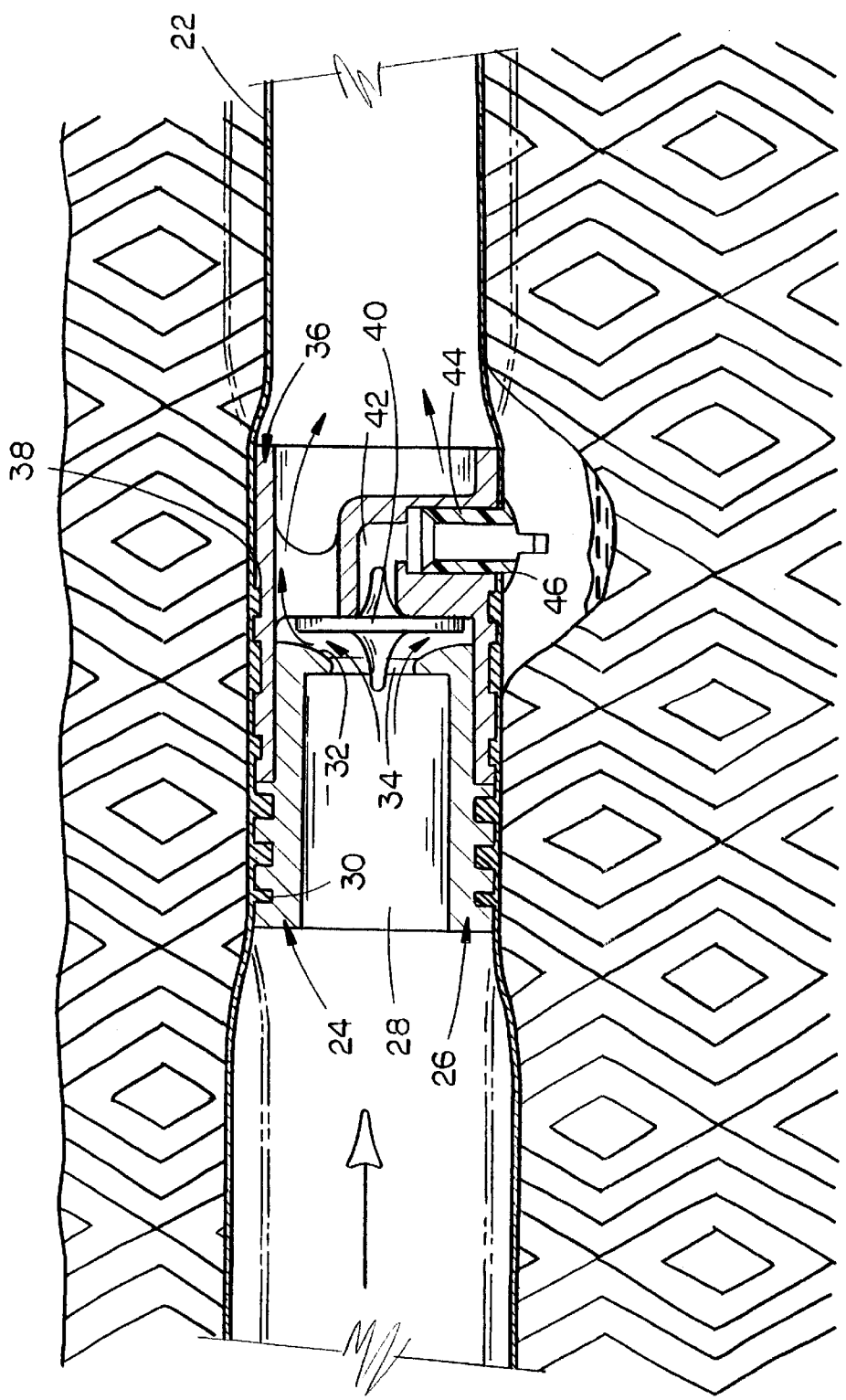
FIG. 6 is a sectional view illustrating the pulse emitter of this invention imposed in one of the distribution water lines.
Figure 7:
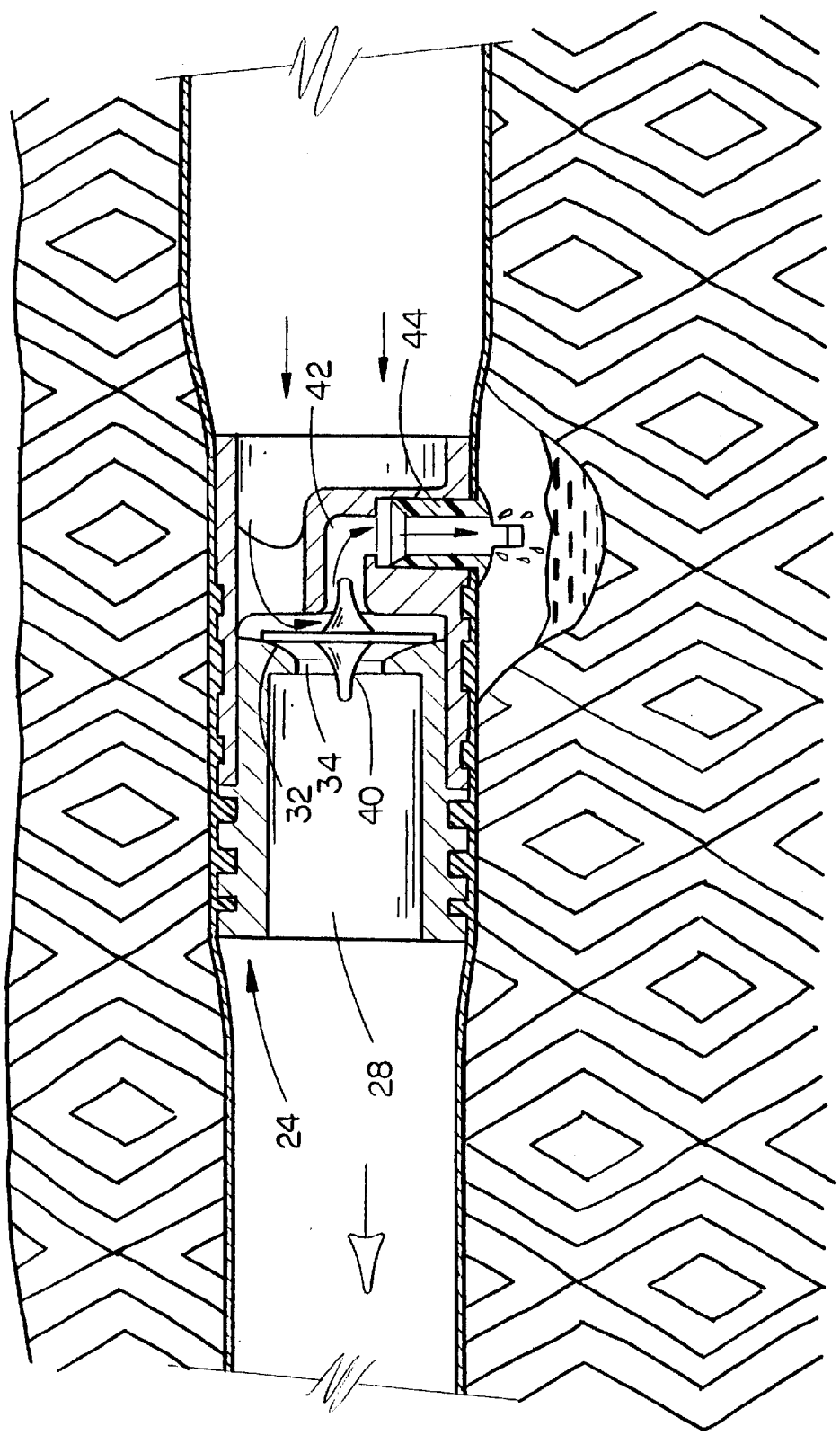
FIG. 7 is a view similar to FIG. 6 except that the pulse emitter is illustrated in its discharge position.

The in-line emitter valve 24 which is utilized in this system is best illustrated in FIGS. 3–7. As illustrated in FIGS. 6 and 7, emitter valve 24 includes an orifice 26 having a central cavity or chamber 28 formed in its upstream side which extends into the orifice 26. The exterior surface of orifice 26 is provided with a plurality of annular grooves 30 formed therein which received portions of the distribution line or tube 22 during the molding thereof to positively maintain emitter valve 24 in its desired position. Orifice 28 has a valve seat 32 at its downstream side which extends around opening 34. Emitter valve 24 also includes a tubular-shaped body 36 which is mounted on the downstream side of orifice 26 and which also has a plurality of annular grooves 38 formed therein which receive material from the line or tube 22 during the molding of the tube or line 22. In other words, the emitter valve 24 is positioned in the tube 22 during the extrusion or fabrication thereof. Valve flapper 40 is movably mounted in body 36 and has its downstream side adapted to close bore or opening 42 formed in body 36, as seen in FIG. 6. Thus, when valve flapper 40 is in the position of FIG. 6, the opening 34 permits water to pass around the valve flapper 40 and to move downstream through the distribution line 22. When the valve flapper 40 is in the position of FIG. 7, valve flapper 40 seals upon valve seat 32 to close the opening 34 and opens the inlet end of the passageway 42. The numeral 44 refers to a nail-like member which is extended through an opening 46 formed in line 22 and which has its inner end received by the body 34 so that water in passageway 42 may exit or be discharged from the emitter, as illustrated in FIG. 7.

Assuming that a water supply exists at the center of the field, one could run main lines (primary water lines) from the center of the field to the extreme corners of the field. This could be PE tubing, 2 ½" or 3" diameter, and rated at 70 psi working pressure. The header lines are teed into the primary water line, but are separated from the primary water line by a three-way pulse valve 18. the header lines are approximately 120 feet in length. At six foot intervals, the header line is tapped for the distribution water lines 22. Each tap will handle two distribution lines (one each side of the header).

When started, the system is brought to pressure and the pulse valve automatically starts pulsing. This action primes the distribution line and allows it to pulse and distribute water. Since the distribution line is at static pressure, before the pulse occurs, and the spacing of the distribution emitters is uniform, the uniformity of distribution is assured. If one is on rough and rolling ground, the uniformity of application will be diminished, unless the tubes are placed on the contour. The amount that the uniformity is affected is determined by the initial operating pressure and the variation of elevation for each distribution tube. Higher operating pressures have higher uniformity when elevational changes do occur.

FIG. 6 illustrates the system being brought to pressure. At this time, water passes through the opening 34 and travels downstream to bring the distribution line 22 to pressure. When a predetermined pressure has been achieved in distribution line 22, the pulse valve 18 in communication therewith automatically starts pulsing. When the pulse valve pulses after the line has been brought to pressure with the tube or line 22 on the upstream side of the emitter valve 24 having expanded from the dotted line position to the full line position and after the tube 22 has expanded from the solid line position in FIG. 6 to the broken line position in FIG. 6, the pulse valve pulses which causes the valve flapper 40 to move from the position of FIG. 6 to the position of FIG. 7 so that the pressure within the line 22 at the downstream side of the valve flapper 40 will cause the valve flapper 40 to be moved to the closed position so that the water may be discharged from the tube, as illustrated in FIG. 7.

Thus it can be seen that a novel invention has been provided which accomplishes at least all of its stated objectives.

I claim:

1. An irrigation system for a field area, comprising:

a source of water under pressure;

a primary water line extending from said source of water to the vicinity of the field area to be irrigated;

at least one header water line in fluid communication with said primary water line and extending therefrom;

a pulse valve imposed in said header water line;

a plurality of distribution water lines in fluid communication with said header water line and extending therefrom downstream of said pulse valve;

a plurality of spaced-apart, in-line emitter valves imposed in said distribution water lines and having a water discharge orifice for discharging irrigation water to the area immediately adjacent thereto;

said primary water line, header water line and said distribution water lines being buried below the surface of the field;

said irrigation system comprising a center pivot irrigation machine which irrigates a generally circular portion of a square field;

and a primary water line being extended to each unirrigated corner of the field;

said distribution lines being buried beneath the surface of the corners of the field.

2. The irrigation system of claim 1 wherein said pulse valve is a three-way pulse valve.

3. The irrigation system of claim 1 wherein each of said distribution lines are expandable under pressurization.

4. An irrigation system for a field area, comprising:

a source of water under pressure;

a primary water line extending from said source of water to the vicinity of the field area to be irrigated;

at least one header water line in fluid communication with said primary water line and extending therefrom;

a pulse valve imposed in said header water line;

a plurality of distribution water lines in fluid communication with said header water line and extending therefrom downstream of said pulse valve;

a plurality of spaced-apart, in-line emitter valves imposed in said distribution water lines and having a water discharge orifice for discharging irrigation water to the area immediately adjacent thereto;

said primary water line, header water line and said distribution water lines being buried below the surface of the field;

said irrigation system comprising a center pivot irrigation machine which irrigates a generally circular portion of a square field;

and a primary water line extended to at least one of the unirrigated corners of the field;

said distribution lines being buried beneath the surface of the corner of the field.

5. An irrigation system for a field area, comprising:

a source of water under pressure;

a primary water line extending from said source of water to the vicinity of the field area to be irrigated;

at least one header water line in fluid communication with said primary water line and extending therefrom;

a pulse valve imposed in said header water line;

a plurality of distribution water lines in fluid communication with said header water line and extending therefrom downstream of said pulse valve;

a plurality of spaced-apart, in-line emitter valves imposed in said distribution water lines and having a water discharge orifice for discharging irrigation water to the area immediately adjacent thereto;

said primary water line, header water line and said distribution water lines being buried below the surface of the field;

each of said distribution water lines being expandable under pressurization.

6. The irrigation system of claim 5 wherein said pulse valve is a three-way pulse valve.

* * * * *